United States Patent
Day et al.

[11] Patent Number: 6,110,321
[45] Date of Patent: Aug. 29, 2000

[54] METHOD FOR SEALING AN ULTRACAPACITOR, AND RELATED ARTICLES

[75] Inventors: James Day, Scotia; Andrew Philip Shapiro, Schenectady; Elihu Calvin Jerabek, Glenmont, all of N.Y.

[73] Assignee: General Electric Company, Schenectady, N.Y.

[21] Appl. No.: 08/808,410

[22] Filed: Feb. 28, 1997

[51] Int. Cl.[7] .................................................. B32B 31/00
[52] U.S. Cl. .......................... 156/286; 156/382; 29/25.03
[58] Field of Search .................................... 156/285, 286, 156/382; 29/25.03

[56] References Cited

U.S. PATENT DOCUMENTS

| | | | |
|---|---|---|---|
| 1,583,381 | 5/1926 | Zimmerman | 156/286 X |
| 2,945,976 | 7/1960 | Fridrich et al. | 156/286 X |
| 5,069,734 | 12/1991 | Kavanaugh et al. | 156/84 |
| 5,400,211 | 3/1995 | Evans | 361/502 |
| 5,464,453 | 11/1995 | Tong et al. | 29/25.03 |

OTHER PUBLICATIONS

"Design, Construction, and Testing of a 28–V, 15.5 F Composite Electrode CDL Capacitor", by Stephen A. Merryman, Boyd D. Stephens, and M. Frank Rose, Space Power Institute, Auburn, Univ., AL, pp. 108–111.

*Primary Examiner*—Francis J. Lorin
*Attorney, Agent, or Firm*—S. Bruce Brown; Noreen C. Johnson

[57] ABSTRACT

An improved process for sealing at least one ultracapacitor which includes a multi-layer structure is disclosed. The process includes the step of applying a substantial vacuum to press together an uppermost layer of the structure and a lowermost layer of the structure and to evacuate ambient gasses, wherein a sealant situated in a peripheral area between the facing surfaces of the layers forms a liquid-impermeable seal for the structure under the vacuum. In some embodiments, a press is used to apply pressure to the peripheral area on which the sealant is disposed. Usually, the ultracapacitor would be situated within an enclosable region of the press, and a collapsible membrane would be fastened over the ultracapacitor to fully enclose the region and transmit the vacuum force to the multi-layer structure. The force applied by the press itself causes the sealant to flow, thereby ensuring a complete seal upon curing of the sealant. This process can be employed to seal one ultracapacitor or a stack of at least two ultracapacitors.

Another embodiment of this invention is directed to an apparatus for sealing a multi-layer ultracapacitor, comprising the elements described above.

32 Claims, 5 Drawing Sheets

METHOD FOR SEALING AN ULTRACAPACITOR, AND RELATED ARTICLES

This invention was made with Government support under NREL Subcontract No. ZCB-4-13032-02 and Prime Contract No. DE-AC36-83CH10093 awarded by the Department of Energy. The Government gas certain rights in this invention.

TECHNICAL FIELD

This invention relates generally to ultracapacitors. More particularly, it relates to methods for preparing ultracapacitors for use.

BACKGROUND OF THE INVENTION

Ultracapacitors are energy storage devices. They are sometimes referred to as "double layer capacitors", and are notable for their ability to store more energy per unit weight and volume than conventional capacitors. They are also able to deliver the stored energy at a higher power level than is possible with other electrochemical devices, such as batteries. In general, an ultracapacitor cell contains two porous electrodes that are isolated from electrical contact by one or more porous separators or physical separating mechanism. An electrolytic solution usually surrounds and impregnates the electrodes and separation zone. By this means, ionic current can flow between the electrodes, and electrical power is produced by the ultracapacitor. The current is generated at the electrodes, and is usually conducted out of the cell by a current collector, which is in contact with each electrode. Thus, an ultracapacitor cell is usually composed of two electrodes contacting current collectors; an electrolyte; a separator; and some method of delineating the boundary of a cell, such as a sealed container. Frequently, multiple ultracapacitor cells are arranged in series connection, often referred to as "stacks", to yield an increased operating voltage. Furthermore, ultracapacitor cells or series stacks may be connected in parallel arrangement to yield increased power capability. These types of ultracapacitors can be found in a wide variety of devices, such as memory protection circuits, cellular phones, toys, and other devices needing high power for a relatively short duration.

In operation, an electrode potential, or voltage, exists across the electrodes in the ultracapacitor. Ionic current can then flow as anions are discharged from the surface of the positive electrode where they were stored. In similar fashion, cations are discharged from the surface of the negative electrode. The electrical charges are held on the surface of the porous electrode, whereupon they generate an electrode potential. This potential increases in a generally linear fashion with the quantity of charge species, or ions, being stored on the surface.

The performance of an ultracapacitor is affected by a variety of factors. One important characteristic which relates to the operating performance of the ultracapacitor is its internal resistance, which is usually designed to be as low as possible. In certain types of ultracapacitors, the presence of oxygen and other contaminants therein undesirably increases the resistance, and may have other deleterious effects on the operation and life of the ultracapacitor. Residual gasses can also initiate corrosion within the ultracapacitor, which could in turn damage the device. Moreover, these gasses could cause the ultracapacitor to rupture, for example, when external pressure is applied to sealed cells. (External pressure is commonly employed to reduce the internal resistance of ultracapacitor cells).

Clearly, the presence of ambient gasses (those gasses in the environment in which the device is being manufactured) is related directly to the manufacturing process used to make the ultracapacitor, and specifically to the final process steps, i.e., the sealing of the ultracapacitor package. Thus, one can readily understand that new methods for sealing an ultracapacitor would be welcome in the art. The methods should ensure that the ultracapacitor maintains the necessary attributes, such as low internal resistance and an acceptable operating voltage. Moreover, the methods should not be unduly complicated, or involve excessive expense. Furthermore, the resulting ultracapacitors should be capable of withstanding high external pressures without rupture of the cell containment, and without being otherwise damaged.

SUMMARY OF THE INVENTION

In response to the needs discussed above, the present inventors have discovered an improved process for sealing at least one ultracapacitor which includes a multi-layer structure. The process comprises the following steps:

(a) applying a substantial vacuum to press together an uppermost layer of the structure and a lowermost layer of the structure, and to evacuate any ambient gasses (e.g., air or an inert gas, depending on the environment in which the ultracapacitor is manufactured) from the internal region of the structure, wherein a sealant situated in a peripheral area between the facing surfaces of the uppermost layer and the lowermost layer forms a liquid-tight seal for the structure under the vacuum; and then (b) releasing the vacuum.

The uppermost layer and the lowermost layer of the ultracapacitor are usually conductive layers. In preferred embodiments, a press is used to apply pressure to the peripheral area on which the sealant is disposed. Usually, the ultracapacitor would be situated within or upon an enclosable region of the press (e.g., within a recess), and a collapsible membrane would be fastened over the ultracapacitor to fully enclose the region and transmit the vacuum force to the multi-layer structure. The force applied by the press itself causes the sealant to flow, thereby ensuring a complete seal upon curing of the sealant. Moreover, a heating mechanism can optionally be utilized to enhance the flow of the sealant while the multi-layer stack is being compressed.

This process can be employed to seal one ultracapacitor or a stack of at least two ultracapacitors. Moreover, the invention can be used for many different types of ultracapacitors, such as the standard, single-cell type, or a bipolar ultracapacitor. Ultracapacitors sealed using the invention contain, at most, only very small amounts of undesirable gasses such as oxygen. Moreover, they are highly resistant to leakage of the electrolyte, and are very amenable to the pressures used in subsequent process steps, such as stack formation.

Another embodiment of this invention is directed to an apparatus for sealing a multi-layer ultracapacitor, comprising the following elements:

(I) vacuum means for pressing together the layers of the multi-layer structure; and (II) a sealant disposed in a peripheral area between the facing surfaces of an upper layer of the multi-layer structure and a lower layer of the multi-layer structure. In preferred embodiments, the apparatus further includes:

(III) a press, which itself comprises an enclosable region for the ultracapacitor, and which is adapted to apply a force to the peripheral area on which the sealant is disposed.

The apparatus can also include some of the other features mentioned above and further described below, such as the flexible membrane, as well as the heating mechanism for raising the temperature of the sealant.

Other details regarding this invention will follow.

DETAILED DESCRIPTION OF THE INVENTION

Figure 1:
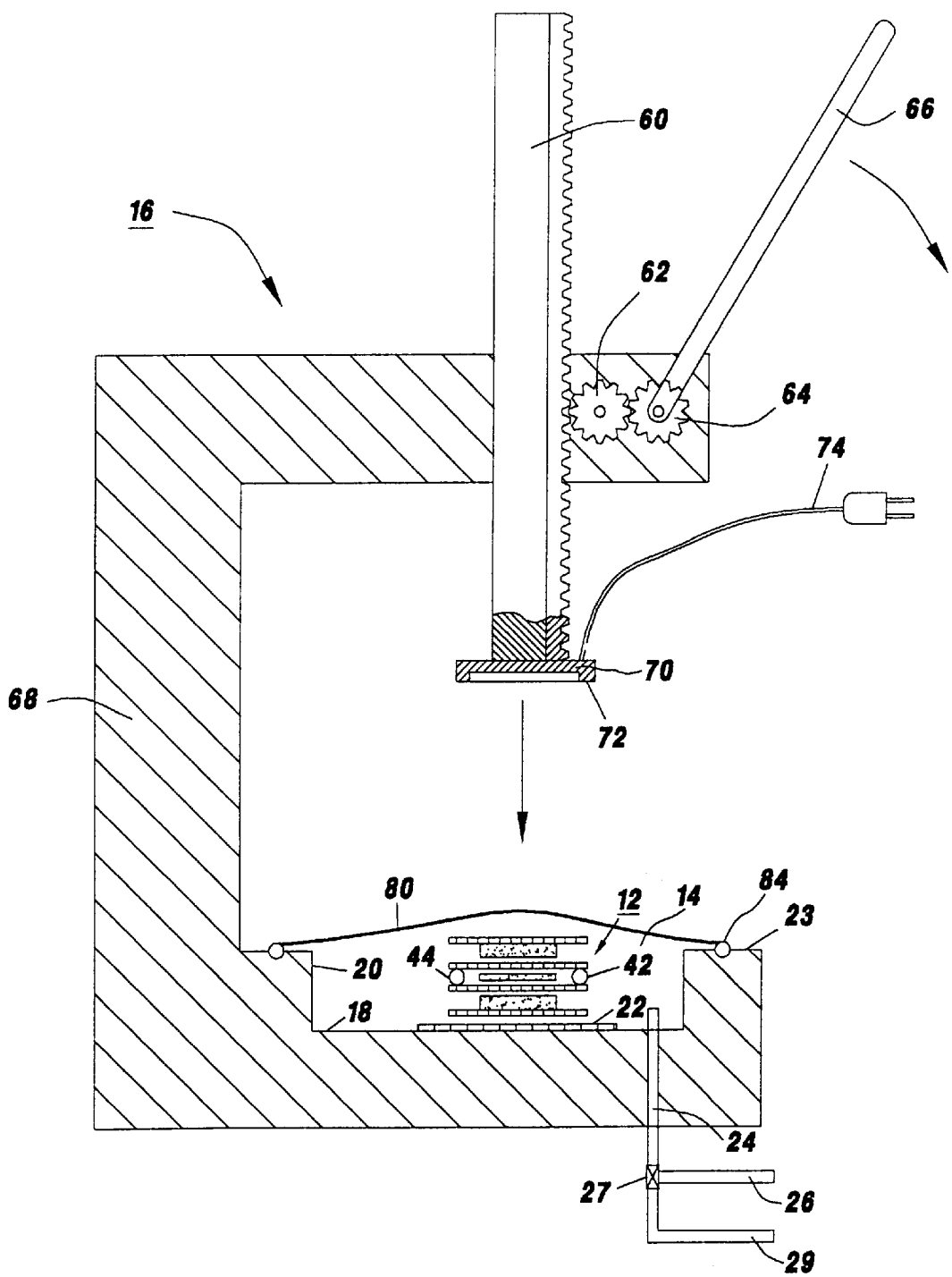
FIG. 1 is an elevational cross-section of an exemplary apparatus suitable for sealing the featured ultracapacitor according to one embodiment of the present invention.

The apparatus of FIG. 1 includes features which are common to all embodiments of the disclosed invention, as well as optional features which are sometimes present in some of the preferred embodiments. In broadest terms, the method itself involves disposing at least one ultracapacitor on or within an enclosable region of structure 16. Structure 16 itself can be any sort of frame, platform, or other construction, but is often a press, as described below.

The illustrative "enclosable region" depicted in FIG. 1 is recess 14, in which ultracapacitor 12 is disposed. The recess includes sidewalls 20 and bottom 18, and has dimensions which are sufficient for accommodating the ultracapacitors being sealed. The materials forming bottom 18 and walls 20 are not particularly critical. Usually, they are somewhat rigid and made from metallic materials such as tool steel, or polymer materials such as plastics or Teflon®-type products. Sometimes, the ultracapacitor is placed on some sort of platform layer 22. A primary gas/vacuum tube 24 communicates with recess 14. The specific location of tube 24 is not critical, as long as it permits evacuation when necessary. Thus, the tube could be located at some point under platform 22, as long as minimum spacing is provided. In those embodiments in which heat is to be applied to the ultracapacitor (as discussed below), layer 22 is preferably made from a thermal-insulating material such as a ceramic or plastic.

The use of a recess as the enclosable region is preferable in some embodiments, e.g., when a stack of ultracapacitors is being sealed. However, the enclosable region need not be a recess. Instead, the ultracapacitor could be disposed on a flat surface. In FIG. 1, for example, surface 18 could be flush with surface 23. (Surface 18 could even be raised above surface 23). In this instance, the "enclosable region" would simply be that area which surrounds and contains the ultracapacitor during the vacuum-application step. As an example, when a collapsible membrane 80 is fastened over the ultracapacitor (as described below) in preferred embodiments, the area upon which the membrane collapses would be considered the enclosable region. It is the region which is affected by the action of the vacuum.

Other variations are of course possible for this aspect of FIG. 1. For example, platform 22 could be raised considerably within the recess, or could in fact be much thicker, e.g., having a height greater than or equal to that of surface 23. Of course, an enclosable membrane would then have a shape modified to accommodate the height of ultracapacitor 12, or to accommodate a stack of ultracapacitors, or be compliant enough to stretch over the ultracapacitor or ultracapacitors.

A wide variety of ultracapacitors may be sealed according to this process. In general, they are well-known in the art and described in many references, such as U.S. Pat. Nos. 5,464,453; 5,420,747; 5,150,283; 5,136,472; and 4,803,597: as well as PCT Application WO 96/11486 (PCT/US95/12772; Apr. 18, 1996), all of which are incorporated herein by reference. As mentioned above, they usually contain two porous electrodes isolated from contact by one or more porous separators or separation zone. Each of the electrodes is usually attached to a current-collecting plate. The ultracapacitor is filled with any type of suitable electrolyte (usually a liquid) before being sealed.

Figure 2:
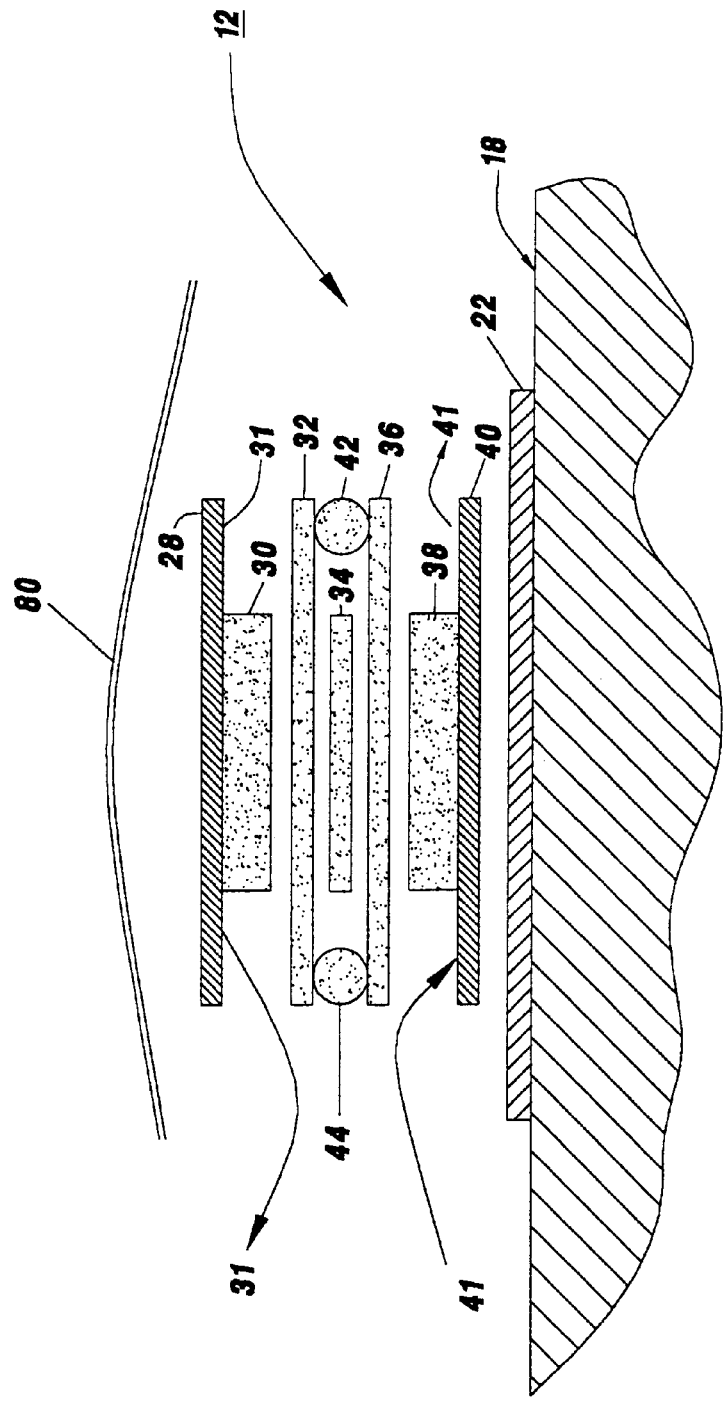
FIG. 2 is an elevational cross-section of the ultracapacitor featured in FIG. 1.

Device 12 represents one, non-limiting example of an ultracapacitor which may be sealed according to this invention. As shown in FIG. 2, that type of ultracapacitor includes an uppermost conductive layer 28 and a lowermost conductive layer 40, which each serve as current-collecting plates. They are typically square or rectangular, but are sometimes made in other shapes. The conductive layers are usually formed from a metal like aluminum, titanium, nickel, stainless steel, or tantalum; or from a plastic made conductive by the incorporation of an agent like carbon black. Electrodes 30 and 38 (usually in the form of layers) are typically made from carbonaceous materials like carbon powder in combination with various additives. The "internal region" of the ultracapacitor is the region or volume between its uppermost and lowermost layers, i.e., the area which will constitute the interior of the ultracapacitor after it has been sealed.

A wide variety of types and arrangements of separation arrangements can be employed, as those of ordinary skill in the capacitance arts realize. Separation layers are usually made from nonconductive materials, such as cellulosic materials, glass fiber; polymers such as polyesters or polyolefins; and the like. In those embodiments in which the separator layers will be in contact with the sealant material, they should have a porosity sufficient to permit the passage of sealant therethrough, as described below, but should also not be adversely affected by any of the chemical components in the sealant. In a typical ultracapacitor, the separator layers have a thickness in the range of about 0.5 mil to about 10 mils.

FIG. 2 depicts one, non-limiting illustration of a separator system, comprising an upper separator layer 32, a lower separator layer 36, and a middle separator layer 34. The actual dimensions of each layer (e.g., length and width, when they are square or rectangular) may vary substantially, as long as at least one of the layers is large enough to isolate the conductive layers from each other. In this embodiment, sealant portions 42 and 44 are disposed in a peripheral area between the bottom surface of separator 32 and the top surface of separator 36.

As used herein, "peripheral" refers to the boundary area of the separator layers. In general, this area should be as small as possible. This boundary area is designated as element 50 in FIG. 3. This figure provides a top, cross-sectional view of a separator layer similar to layers 32 and 36 of FIG. 2, after the sealant has spread to some extent by the action of pressure and, optionally, heat, as described below. The boundary area surrounds the primary section 52 of a separator layer. As a useful rule, the boundary area (assuming that it is completely covered with sealant) has to be large enough to permit the sealant to form an impermeable seal around the perimeter of the various layers of the ultracapacitor, but not so large as to interfere with the electrochemical operation of the ultracapacitor. As one illustrative estimate for a typical ultracapacitor having square-shaped separator layers with a length and width of about 15 cm, the boundary area will usually have a width (i.e., dimension "x" in FIG. 3) of from about 0.15 cm to about 1.5 cm.

Many different types of sealants may be used in the present invention, and the term is meant to encompass "cements", "glues", or "pastes". Sealants are described, for example, in the *Kirk-Othmer Encyclopedia of Chemical Technology,* 3rd Edition, Vol. 1, pp. 488–508 (1978), and in *The Condensed Chemical Dictionary,* 10th Edition, 1981, Van Nostrand Reinhold Company. In general, the selected sealant should be chemically resistant to the electrolyte. It should also be capable of withstanding the operating temperatures of the ultracapacitor without substantial degradation, e.g., temperatures of at least about 75° C., and preferably, about 100° C. Moreover, the sealant (in a fluid or semi-solid state) should be capable of flowing through the thickness of the separator layers, in those embodiments where the sealant contacts the separators. Once cured, the sealant should be substantially impermeable to the flow or passage of electrolyte.

Heat-curable sealants may be used in some embodiments. Moisture-cured sealants or externally-cured materials (e.g., 2-part systems) may alternatively be used. Other embodiments may use air-curable or "pressure-sensitive" sealants, such as the "hot melt" glues available in many retail stores. Illustrative sealants include those based on acrylic, ethylene (e.g., ethylene vinyl acetate (EVA) copolymer), silicone, rubber, epoxy materials, or combinations of any of these materials. Commercial examples include the materials commonly referred to as "hot glues", e.g., Hysol's Hot Glue #7802.

Figure 3:
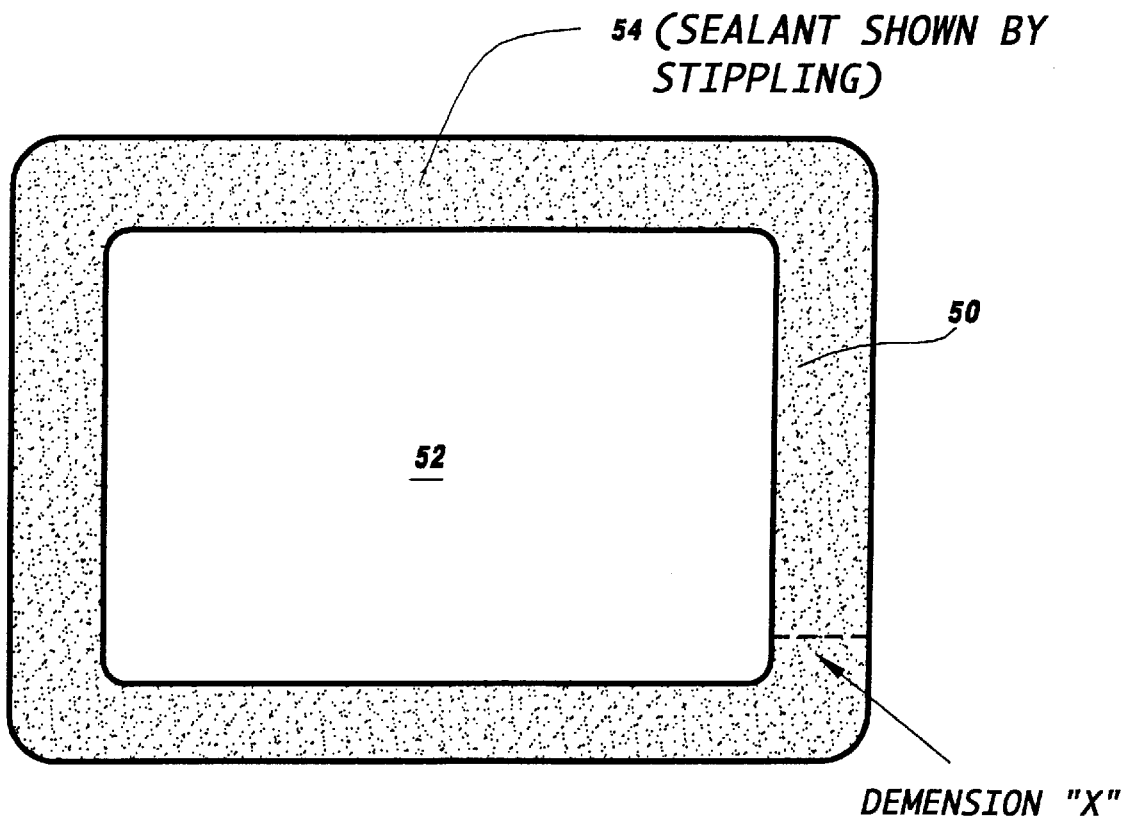
FIG. 3 is a top, cross-sectional view of a separator layer of an ultracapacitor sealed according to the present invention, wherein a sealant has been deposited on the separator layer.

The sealants are usually in the form of liquids, pastes, or solids. For this invention, the sealant may be applied to one or both of the facing surfaces of the separators (or other surfaces, as described below). Many different techniques are available for applying the sealants, and the selection of a particular technique will depend on various factors, such as the type of sealant and its rheological characteristics. Known application techniques include the use of a spatula, brush, roller, spray, or glue gun. As one example, a bead, strip or "ring" of sealant could be applied along the peripheral area of one of the separator layers. Alternatively, individual droplets of sealant might be deposited at various sites in the peripheral area, if the droplets had the ability to flow and eventually cover the entire peripheral area upon the application of vacuum and, optionally, heat. As yet another alternative, at least one of the separator layers could be pre-impregnated with the sealant. All of these techniques cause the sealant to form a continuous, peripheral layer 50 (i.e., the boundary area on which the sealant 54 has been applied and has usually spread to some extent), as shown in FIG. 3. In general, the particular method of deposition is not critical, as long as the sealant is applied to locations where it will eventually form a seal after the vacuum is released. (Those skilled in the sealant arts understand that these materials cure or solidify according to various chemical mechanisms which can occur as the presently-described process is carried out). In other words, the ultracapacitor would become sealed by a barrier which is perpendicular to the horizontal capacitor layers, and which encases those layers.

In some preferred embodiments, physical pressure is utilized to promote the flow of the sealant—especially in the case of sealant compositions with very high softening points or glass transition temperatures, such as the EVA-based types. The pressure can be applied indirectly to the sealant through any ultracapacitor layers above the sealant. Thus, in some of these embodiments, structure 16 of FIG. 1 may comprise a press. The particular type of press is not critical to this invention. Thus, mechanical presses, hydraulic presses, pneumatic presses, or any other type of device for applying compressive force is thought to be suitable. Various details regarding the presses are well-known in the art (e.g., computerized pressure-sensing devices and controls), and need not be described here.

The exemplary press featured in FIG. 1 is a simple mechanical version, often referred to as an "arbor press". It includes a structural frame 68 and an adjustable beam 60. As should be apparent from the figure, the length of the beam can move in a direction perpendicular to the base portion of the structural frame, by way of the selective action of hand lever 66 and gears 62 and 64. A detachable compression element 70 is attached as the base of beam 60. Its bottom surface 72 need not have a special shape, but preferably has a shape similar to the peripheral area of the top, planar surface of ultracapacitor 12, i.e., the area which will generally be aligned vertically with the sealant.

The force applied by the press should be that which is sufficient to cause the sealant to become substantially fluid, i.e., to flow and form a continuous bead or strip around the peripheral area of the layer on which it is deposited, as discussed previously. Thus, the particular force value depends in large part on the nature (e.g., the molecular weight and rheological characteristics) of the sealant. In general, the pressure would usually be in the range of about 1 psi to about 1,000 psi, and preferably, in the range of about 10 psi to about 100 psi. Lower force values within those ranges would be suitable for lower-viscosity sealants which flow rather easily, while higher force values within those ranges might be required for higher viscosity materials. The pressure is usually applied while the vacuum is also being applied, as discussed below.

In other preferred embodiments, the sealant is heated while being compressed. The heating step—like the compression step itself—enhances the flow characteristics of the sealant. Usually, the temperature utilized is one which is sufficient to soften the sealant. Preferably, the temperature is high enough to melt the sealant. For a sealant made from an EVA-based material, a suitable temperature will usually be in the range of about 100° C. to about 300° C.

Various well-known techniques may be used to apply heat to the area in which the sealant is situated, with the proviso that the chosen technique does not damage any other component of the ultracapacitor (e.g., does not overheat the electrolytic solution within the capacitor cell). In the embodiment depicted by FIG. 1, a standard electrical heating element (not shown) is encased within element 70, and can be connected to an electrical outlet by way of cord 74. Preferably, the bottom surface 72 of element 70 has a shape which permits alignment with the sealant-containing peripheral regions of ultracapacitor 12. Thus, when compression element 70 is lowered for compression of the ultracapacitor through membrane 80 (discussed below), the heat will be transmitted primarily to the sealant-containing regions.

Alternatively, any type of infrared system (IR) could be used to apply heat to the area of interest. For example, many different types of IR lamps could be used or modified for use to provide radiant energy directly to the peripheral area. Moreover, membrane 80 itself could be modified to provide heat in some embodiments, e.g., by the incorporation of heating elements (e.g., heating traces, wires) within the membrane itself. Those of ordinary skill in the art may be able to devise other, effective heating techniques without undue effort, based on the parameters discussed herein.

As mentioned above, a vacuum is applied to press together the layers of the ultracapacitor, and to evacuate ambient gasses from the internal region of the cell structure. In carrying out this step, preferred embodiments call for the positioning of a collapsible membrane 80 over the enclosable region, e.g., recess 14. The membrane should be sufficient to maintain the vacuum and transmit the resulting compressive force to the layers of the ultracapacitor. Many different materials may be used for the membrane, if they are flexible and substantially gas-impermeable. The membrane material should also be strong enough to handle the temperature levels and compressive forces used in this process. If heating steps are used in the process, the membrane should usually be heat-resistant to a temperature of at least about 300° C., and preferably, at least about 400° C. (The lower temperature-materials would probably be suitable when using sealants with lower melting points, which would not require the use of higher-temperature heating systems).

Metal foils like aluminum or copper may be used for membrane 80. Moreover, a wide variety of polymer-based materials might be employed. In those instances in which the membrane will be exposed to considerable heat from a heated element, high-temperature polymers should be used. Examples include polyimides (e.g., Kapton® products), polyphenylene sulfides, polyetherimides, polytetrafluoroethylene, or high temperature-elastomers such as silicone-based rubbers. In preferred embodiments, the polymer material is substantially transparent in sheet form (as is the case for Kapton®-type materials), to permit viewing of the ultracapacitor during the sealing process. The thickness of the membrane will depend on factors such as transparency and material strength, and it will usually be in the range of about 0.5 mil to about 10 mils. The membrane may be attached over the enclosable region (e.g., to the press itself, or to a frame or other structure which is itself attached to the press) by any conventional technique. In the featured embodiment, an o-ring seal 84 is used; it permits easy loading and unloading of an ultracapacitor or stack of ultracapacitors, at the beginning or end of the process.

The vacuum may be applied by any conventional technique. In FIG. 1, primary gas/vacuum tube 24 may be connected to a suitable vacuum source through vacuum feed tube 26, for example. Gas tube 29 is an optional feature useful for a purging step and/or a gas "back-filling" step. A valve 27 (usually a 3-way valve in this embodiment) is used to control gas feed rates and flow through the passageways.

As alluded to above, the enclosable region may sometimes be initially purged of oxygen and other gasses, prior to applying the final vacuum. In order to ensure complete exclusion of these gasses, the enclosable region may then be back-filled (e.g., via tube 29) with hydrogen or an inert gas like helium, and then purged again with a vacuum. The purging and back-filling steps can of course be repeated several times.

The amount of vacuum pressure applied will usually range from about 700 mm mercury to 0.0 mm mercury. Usually, the minimum absolute pressure is desirable. In practice, a typical vacuum pressure will be in the range of about 500 mm mercury to about 0.1 mm mercury. With reference to FIGS. 1 and 2 as an illustration, it can be seen that the applied vacuum pressure will draw collapsible membrane 80 tightly against the top of ultracapacitor 12, compressing the individual layers of the ultracapacitor against platform layer 22.

At about the same time, the action of compression element 70 (optionally heated, as discussed previously), lowered to press against the sealant-containing regions, will induce sealant portions 42 and 44 to permeate the peripheral regions of separator layers 32 and 36 (see FIG. 2). The sealant would then contact substantially aligned peripheral regions of the facing surfaces of conductive layers 28 and 40. As the sealant cures or solidifies, it will form a very strong bond which joins the layers 28 and 40 (through the separator layers), while still maintaining the necessary electrical isolation between the conductive layers.

After sealing is complete, compression element 70 is retracted, and the ultracapacitor is allowed to cool. The vacuum is usually released after the sealant has cured or solidified, and the sample can then be removed for testing and use.

Various alternative embodiments are within the scope of this invention. For example, separator layers need not have the same planar dimension (length and width) as the conductive layers. With reference to FIGS. 1 and 2, separator layers 32 and 36 could instead have a planar dimension identical or similar to that of the middle separator layer 34, as long as conductive layers 28 and 40 remain electrically isolated from each other. In that instance, sealant portions 42 and 44 would usually be disposed in the peripheral area between the conductive layers. The sealant could be applied, for example, to at least one peripheral surface portion 31 or 41 of layers 28 and 40, respectively. Thus, when the vacuum force is applied, along with the force of the optional press, the conductive layers will be pressed tightly against each other, along with the intervening electrodes 30 and 38, and the separator layer or layers. Again, as the sealant cures or solidifies, it will form a very strong bond between the conductive layers 28 and 40, while electrical isolation is maintained.

As alluded to earlier, the present invention also contemplates the sealing of more than one ultracapacitor. Ultracapacitors are commonly stacked—for example, four or five on top of each other—to increase the operating voltage of the overall device. As described in the referenced U.S. Pat. No. 5,420,747, and in PCT Application WO 96/11486, the cells may be connected in series. Moreover, as is known in the art, current may be obtained from the stacks by providing wire current lead-outs in the structure. The stack can be mounted in a compartment-type case, with holes situated in the case to direct the lead-outs to wherever current is desired.

Figure 4:
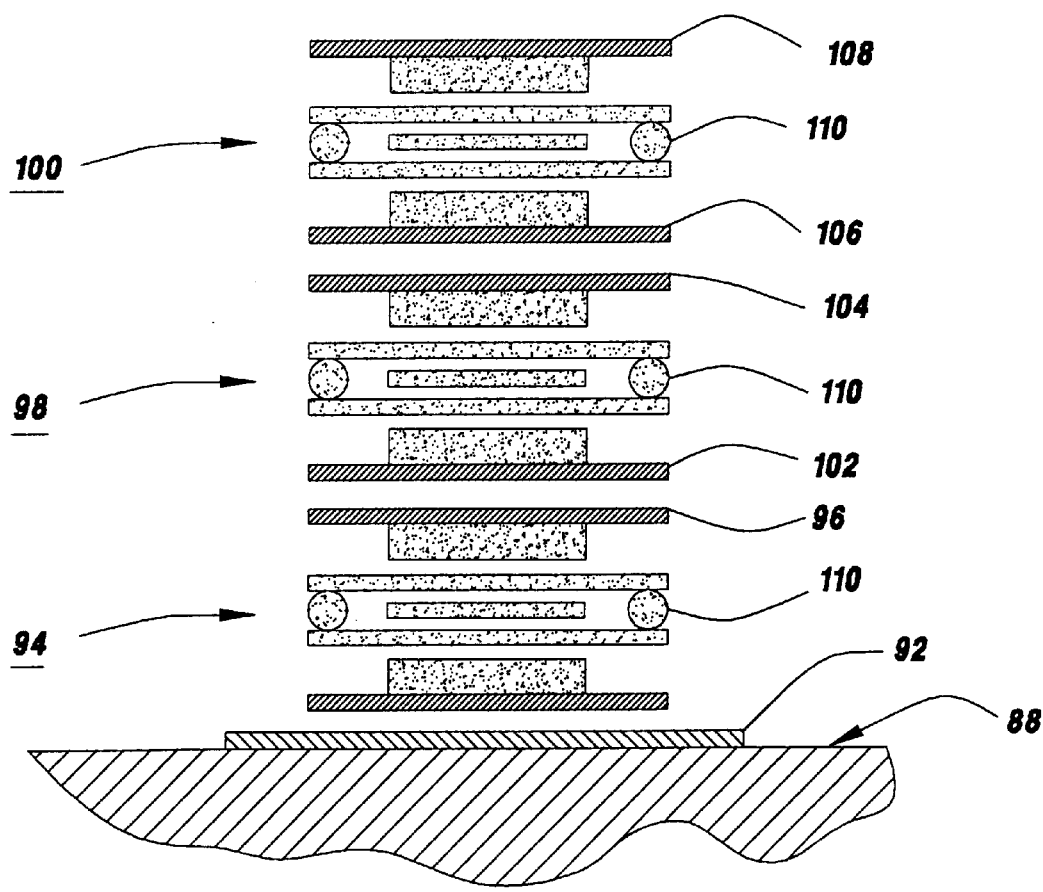
FIG. 4 is an illustration of a stack of ultracapacitors which can be sealed according to the present invention.

FIG. 4 depicts (in simplified form) one exemplary stack, in which ultracapacitors 94, 98, and 100 are mounted on top of each other. The stack is situated on the bottom surface 88 of an enclosable region (not shown) having dimensions suitable for accommodating the stack. A lower conductive layer 102 of ultracapacitor 98 is disposed on an upper conductive layer 96 of ultracapacitor 94, while a lower conductive layer 106 of ultracapacitor 100 is disposed on an upper conductive layer 104 of ultracapacitor 98. Various sealant portions 110 are situated in the peripheral areas of separator layers, in an arrangement analogous to that described previously for a single ultracapacitor.

As in the other embodiment, a vacuum would be applied to the enclosable region (here, usually a recess) after it has been covered, e.g., by the positioning and fastening of a collapsible membrane over the recess, i.e., over the top of conductive layer 108 of ultracapacitor 100. The vacuum, as well as the optional use of the compression element of a press (optionally heated, as discussed previously) will induce the various sealant portions to permeate the respective peripheral regions of the separator layers in each individual ultracapacitor. The sealant would then contact substantially aligned peripheral regions of the facing surfaces of the various conductive layers. Once the sealant cures, it would form an impermeable seal around the perimeter of the various layers of each ultracapacitor, thereby effectively sealing the entire stack. The stack would have the attributes described above for a single, sealed ultracapacitor, e.g., a greatly-reduced incidence of electrolyte leakage when subjected to high, external compression.

As in the case of a single ultracapacitor, various alternative embodiments for the sealing of a stack of ultracapacitors are within the scope of this invention. For example, the separator layers may have a smaller planar dimension as described previously, so that the sealant portions actually contact peripheral areas of the respective conductive layers. Combinations of either type of ultracapacitor could also be stacked and sealed, e.g., some with the larger separators, while others would have the smaller-dimension separators with the sealant directly contacting the conductive layers, as described previously. Moreover, bipolar ultracapacitors could be stacked and sealed in the same manner. In this situation, the upper conductive layer of one ultracapacitor usually serves as the lower conductive layer of another ultracapacitor disposed over the first ultracapacitor.

As mentioned above, this invention is not limited to any particular type of ultracapacitor. As an example, ultracapacitors which employ electrodes of conductive plastic could be sealed effectively. (These types of ultracapacitors are not always considered to be "double layer" ultracapacitors). Those skilled in the electrochemical arts may very well be aware of other types of commercial and experimental ultracapacitors which can be sealed according to these teachings.

It should be apparent that a further embodiment of this invention is directed to an apparatus for sealing at least one ultracapacitor. (As described previously, each ultracapacitor includes a multi-layer structure). The apparatus would contain at least the following elements, each of which has been described previously:

(I) vacuum means for pressing together the layers of the multi-layer structure; and for evacuating ambient gasses from the internal region of the structure; and (II) a sealant disposed in a peripheral area between the facing surfaces of an uppermost layer of the multi-layer structure and a lowermost layer of the multi-layer structure. (As mentioned previously, these two layers are usually conductive layers).

As described previously, in some embodiments, the sealant is disposed in a peripheral area of at least one separator layer. The surface portion of the separator layer which contains the sealant could face a corresponding area of one of the conductive layers, or it could face a second separator layer, for example. The sealant itself could alternatively be situated on the peripheral area of a surface of one of the conductive layers. This peripheral area would usually be substantially aligned with a peripheral area of the other conductive layer which faces the first conductive layer. In fact, sealant portions could be deposited on the vertically-aligned, peripheral regions of more than one layer of an ultracapacitor. The sealant portions could even be deposited on all of the conductive layers and separator layers, depending, for example, on the amount of a particular sealant which is needed for a strong seal.

In preferred embodiments, the apparatus would also include a press, which itself could include an enclosable region (e.g., a recess) for an ultracapacitor or stack of ultracapacitors. The press would be adapted to apply a force to any peripheral areas on which the sealant is disposed. As also described above, the apparatus would preferably include a flexible membrane positioned over the recess. The membrane would be collapsible upon application of the vacuum. Other, optional features of the apparatus have also been described—for example, a mechanism for applying heat to the sealant, and a temperature-insulating platform on which the ultracapacitor or ultracapacitor stack would rest. This apparatus can be efficiently employed to carry out the inventive processes described herein.

EXAMPLES

These examples are merely illustrative, and should not be construed to be any sort of limitation on the scope of the claimed invention.

The effectiveness of the vacuum sealing device was demonstrated by comparing the seal quality of ultracapacitor cells prepared according to the present invention with those prepared under ambient conditions. The electrodes were made by doctor-blading a slurry of activated carbon, electrolyte, and solvent onto aluminum foil current collectors. The slurry was deposited on a 5-inch×5-inch area surrounded by a 0.5-inch border of uncoated foil. Separator paper which fully covered the electrode and bare foil border was placed on each electrode. The separator/electrode half-cell was compressed in a hydraulic press. An EVA-type hot melt glue was shaped into strips. The strips had a width of about 0.125 inch and a thickness of about 0.063 inch. The strips were placed on the border of one half-cell, to form a closed square of sealant.

A middle separator was placed on the half-cell with the glue. Additional electrolyte was added to saturate the separator layer. Another separator/electrode half-cell was placed on top of the first half, with the separators in contact.

The resulting assembly was then heat-sealed. In the case of the non-vacuum method, the heat seal was accomplished by lowering a heated frame onto the border area, and melting the glue. In the case of the present invention, the assembly was placed in a vacuum device as described above, utilizing an arbor press. A vacuum of about 1–5 mm mercury was applied. After the vacuum had stabilized, and the flexible membrane completely conformed to the cell, the heated frame (heated to a temperature of approximately 150° C. to about 300° C.) was lowered onto the glued area. With the vacuum still applied, the cell was allowed to cool. After cooling, the vacuum was released, and the cell was removed from the device.

Figure 5:
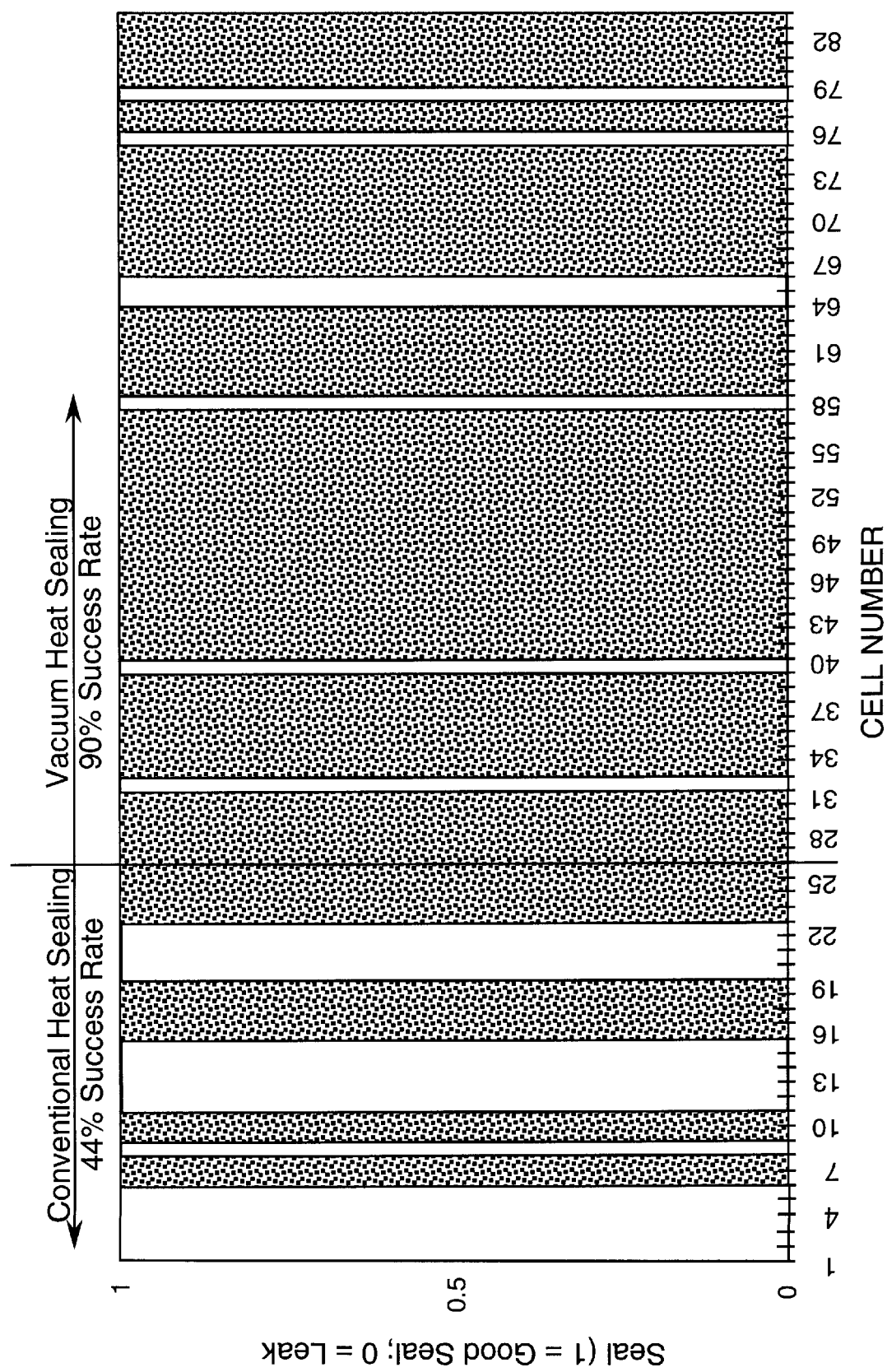
FIG. 5 is a graphical representation of data related to seal-quality for ultracapacitors which were prepared within or outside of the scope of the present invention.

The ultracapacitors were tested by being compressed to approximately 40 psi, simulating the compressive forces that are expected in a stack of ultracapacitors. FIG. 5 provides results for a number of cells tested. Cells identified as 1 to 26 were made without the vacuum-sealing technique of this invention. Only 44% of those cells did not leak electrolyte after the compression test. In marked contrast, 90% of the vacuum-sealed cells (samples 27 to 84) were free from electrolyte leakage after the compression test.

The preferred embodiments have been set forth herein for the purpose of illustration. However, this description should not be deemed to be a limitation on the scope of the invention. Accordingly, various modifications, adaptations, and alternatives may occur to one skilled in the art without departing from the spirit and scope of the claimed inventive concept.

All of the patents, patent applications, articles, and texts which are mentioned above are incorporated herein by reference.

What is claimed:

1. A method for sealing at least one ultracapacitor which includes a multi-layer structure, comprising the following steps:
   (a) applying a substantial vacuum to press together an uppermost layer of the structure and a lowermost layer of the structure, and to evacuate ambient gasses from the internal region of the structure, wherein a sealant situated in a peripheral area between the facing surfaces of the uppermost layer and the lowermost layer forms a liquid-tight seal for the structure under the vacuum; and then
   (b) releasing the vacuum.

2. The method of claim 1, wherein the ultracapacitor is disposed in an enclosable region of a press.

3. The method of claim 2, wherein the enclosable region is a recess.

4. The method of claim 2, wherein the press applies a force to the peripheral areas on which the sealant is disposed, while the vacuum is being applied to the enclosable region of the press.

5. The method of claim 4, wherein the pressure applied by the press is in the range of about 1 psi to about 1,000 psi.

6. The method of claim 2, wherein a collapsible membrane is positioned over the ultracapacitor and attached to the press, said membrane being capable of maintaining the vacuum and transmitting the resulting compressive force to the layers of the ultracapacitor.

7. The method of claim 6, wherein the collapsible membrane is formed of a material comprising a temperature-resistant plastic.

8. The method of claim 6, wherein the collapsible membrane is substantially transparent.

9. The method of claim 1, wherein the sealant is situated on the peripheral area of a separator layer.

10. The method of claim 9, wherein the sealant is situated on the peripheral area of the separator layer, which itself faces a second separator layer.

11. The method of claim 1, wherein the sealant is situated on the peripheral area of a surface of a first conductive layer.

12. The method of claim 11, wherein the peripheral area of the first conductive layer is substantially aligned with a peripheral area of the surface of a second conductive layer which faces the first conductive layer.

13. The method of claim 1, wherein the pressure applied by the vacuum is in the range of about 700 mm mercury to about 0.0 mm mercury.

14. The method of claim 1, wherein the sealant is pressure-sensitive.

15. The method of claim 1, wherein the multi-layer structure of the ultracapacitor comprises:
   (i) an upper conductive layer;
   (ii) an upper electrode disposed on a portion of the surface of the upper conductive layer which faces the lower conductive layer;
   (iii) a lower conductive layer;
   (iv) a lower electrode disposed on a portion of the surface of the lower conductive layer which faces the upper conductive layer; and
   (v) at least one, substantially porous separator layer situated between the upper conductive layer and the lower conductive layer.

16. The method of claim 15, wherein the compression of the multi-layer structure of the ultracapacitor causes the sealant to permeate through the thickness of the separator layers and contact the corresponding, peripheral areas of the upper and lower conductive layers, respectively.

17. The method of claim 16, wherein the sealant is heated while being compressed, to a temperature sufficient to cause the sealant to flow.

18. The method of claim 17, wherein the heating is carried out by pressing a heated element against a region of the multi-layer structure which is aligned with the sealant, through a collapsible membrane which is positioned over the multi-layer structure.

19. The method of claim 18, wherein the heating step is terminated after the ultracapacitor is sealed.

20. The method of claim 2, wherein the enclosable region is purged of substantially all gasses prior to application of the vacuum in step (a).

21. The method of claim 1, wherein a stack of at least two ultracapacitors is sealed.

22. The method of claim 1, wherein a stack of ultracapacitors is sealed, and the stack comprises at least one bipolar ultracapacitor.

23. An apparatus for sealing at least one ultracapacitor which includes a multi-layer structure, said apparatus comprising the following elements:
   (I) vacuum means for pressing together the layers of the multi-layer structure; and for evacuating ambient gasses from the internal region of the structure; and
   (II) a sealant disposed in a peripheral area between the facing surfaces of an uppermost layer of the multi-layer structure and a lowermost layer of the multi-layer structure, and
   (III) a press, which itself includes an enclosable region for the ultracapacitor, and which is adapted to apply a force to the peripheral area on which the sealant is disposed.

24. The apparatus of claim 23, wherein the enclosable region is a recess.

25. The apparatus of claim 23, wherein the sealant is situated on the peripheral area of a separator layer.

26. The apparatus of claim 25, wherein the sealant is situated on the peripheral area of the separator layer, which itself faces a second separator layer.

27. The apparatus of claim 23, wherein the sealant is situated on the peripheral area of a surface of a first conductive layer.

28. The apparatus of claim 27, wherein the peripheral area of the first conductive layer is substantially aligned with a peripheral area of the surface of a second conductive layer which faces the first conductive layer.

29. The apparatus of claim 23, further comprising a flexible membrane positioned over the ultracapacitor and attachable to the press, said membrane being collapsible upon application of the vacuum.

30. The apparatus of claim 23, further comprising a temperature-insulating platform on which the ultracapacitor is disposed.

31. The apparatus of claim 23, further comprising means for applying heat to the sealant.

32. The apparatus of claim 31, wherein the heating means comprises a heater adapted to transmit heat to a region of the multi-layer structure which is aligned with the sealant.

* * * * *